July 8, 1958  K. M. HAMMELL ET AL  2,842,018
RATCHET TYPE HAND TOOL FOR SEVERING AND CRIMPING
MAGAZINE FED ELECTRICAL CONNECTORS
Filed Dec. 8, 1955  6 Sheets-Sheet 1
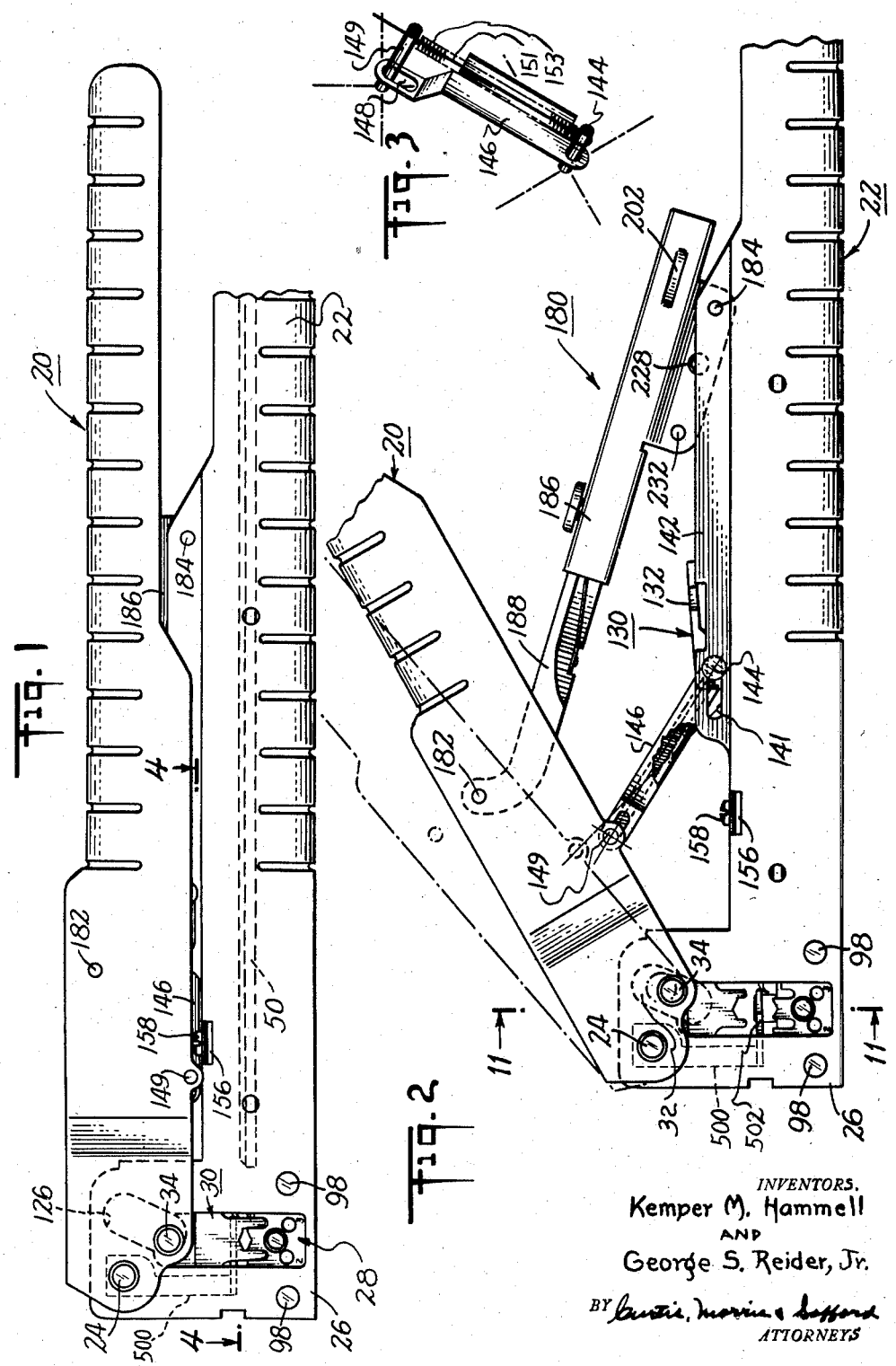
INVENTORS.
Kemper M. Hammell
AND
George S. Reider, Jr.
BY
ATTORNEYS

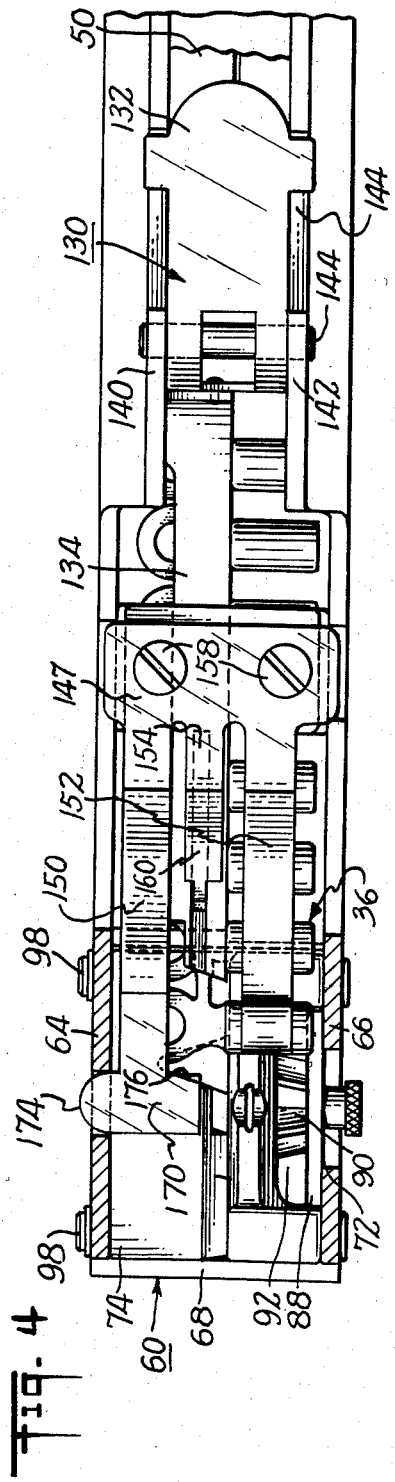

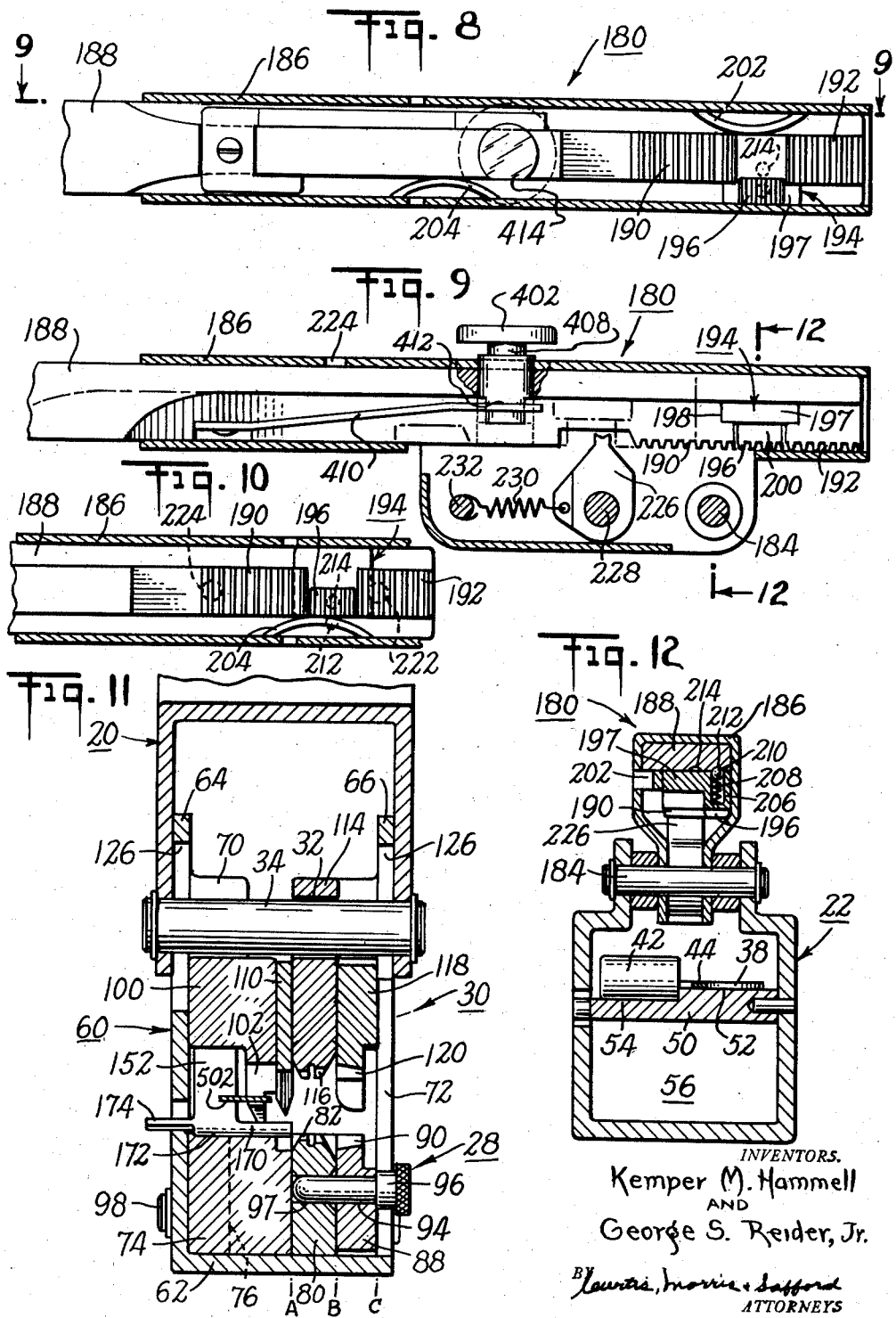

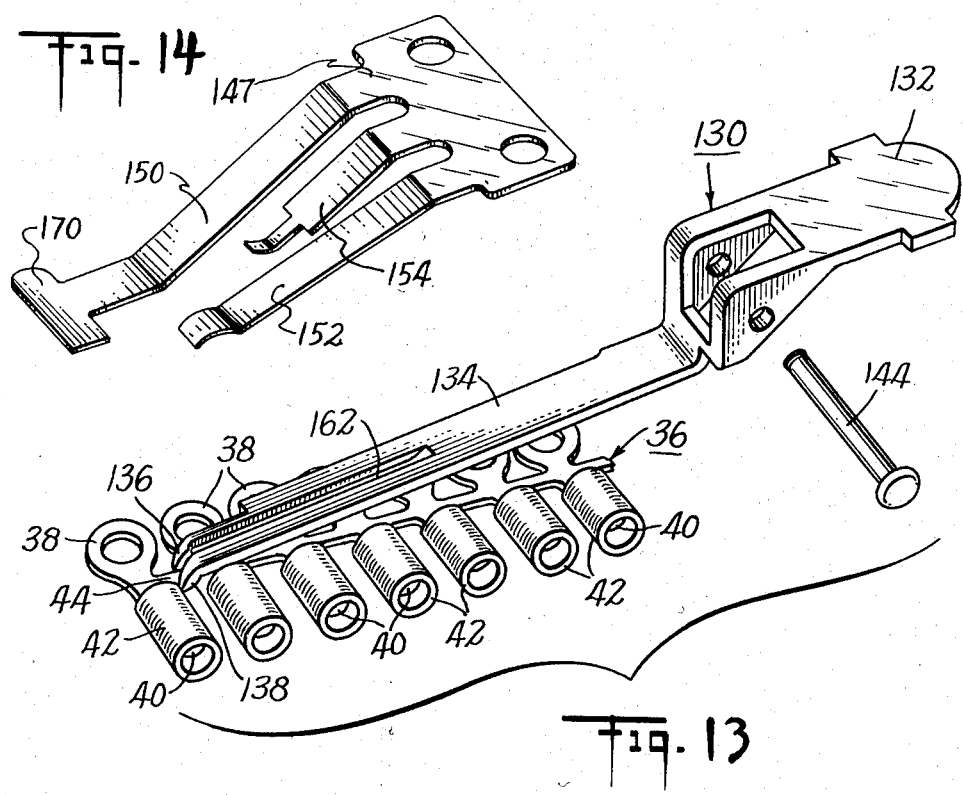
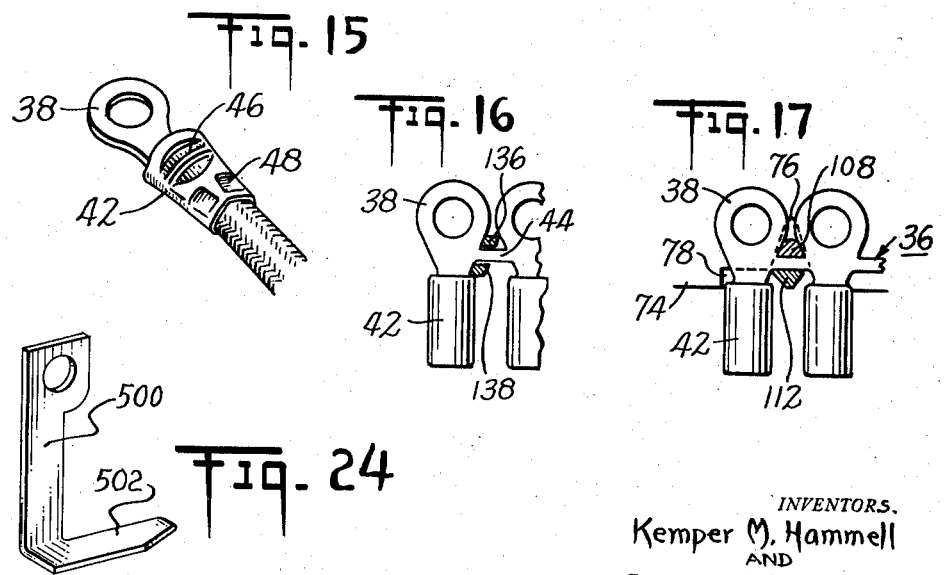

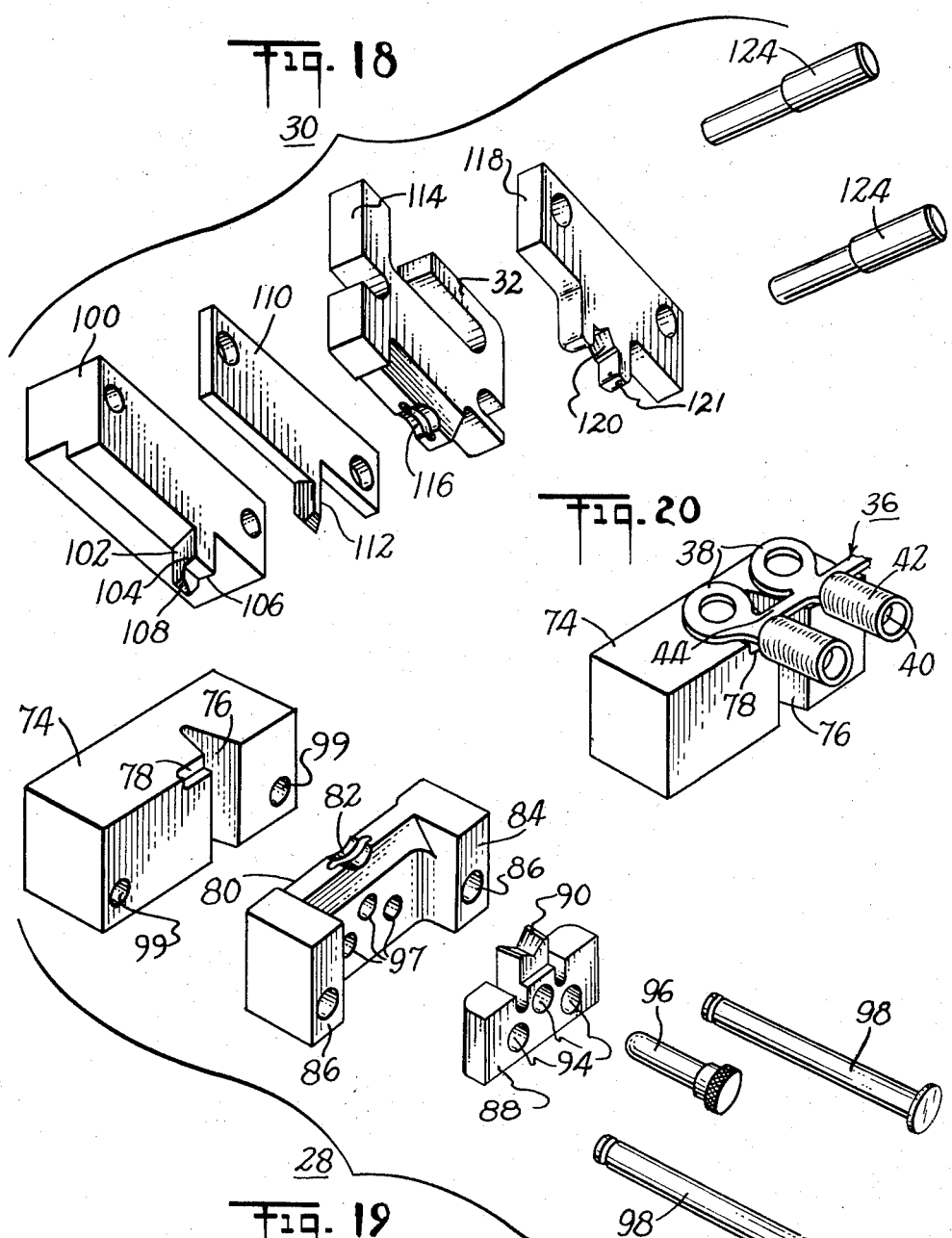

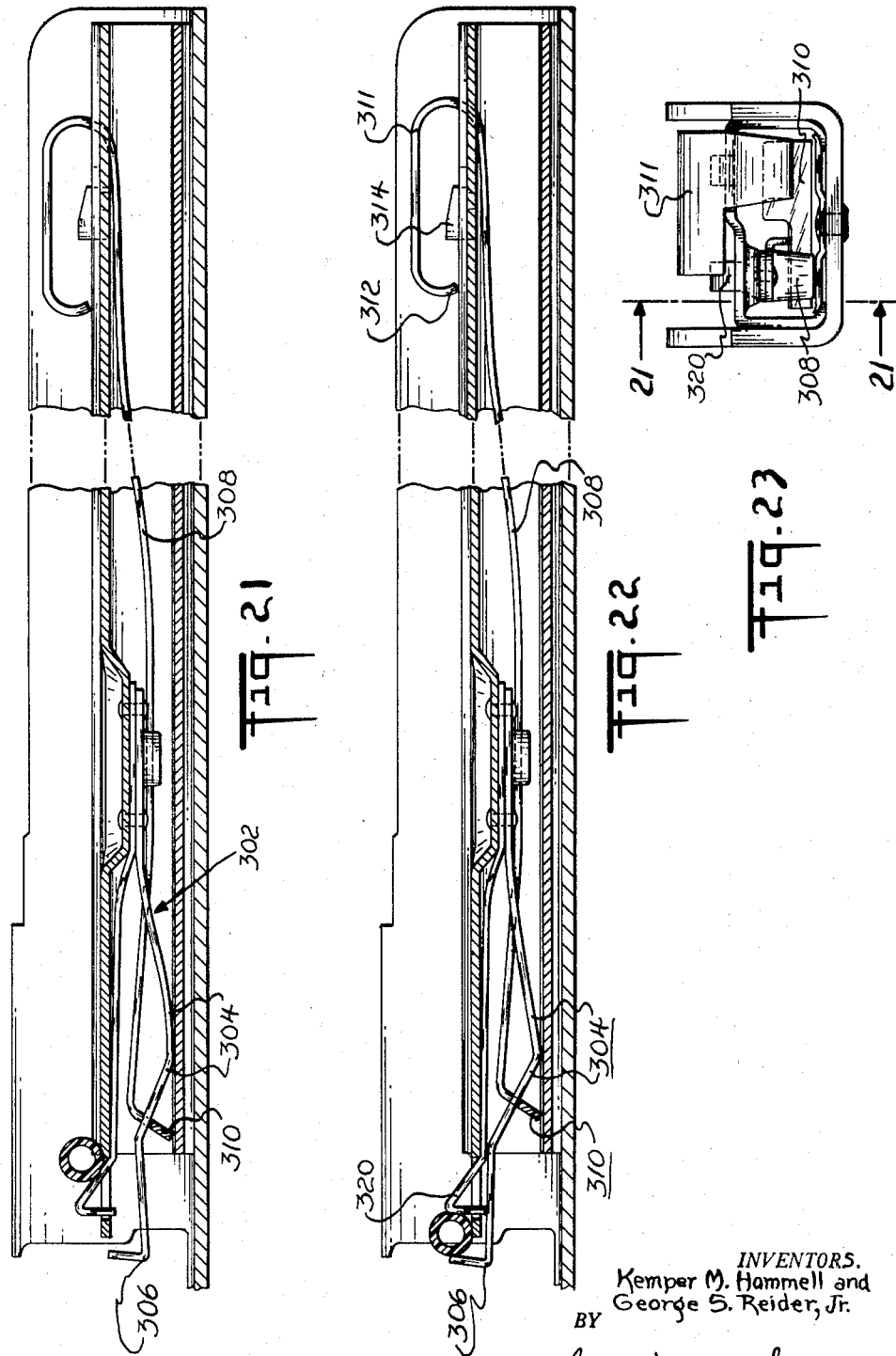

United States Patent Office 2,842,018
Patented July 8, 1958

2,842,018

RATCHET TYPE HAND TOOL FOR SEVERING AND CRIMPING MAGAZINE FED ELECTRICAL CONNECTORS

Kemper M. Hammell, Harrisburg, and George S. Reider, Jr., Highspire, Pa., assignors to AMP Incorporated, a corporation of New Jersey Application December 8, 1955, Serial No. 551,799

6 Claims. (Cl. 81—15)

This invention relates to hand tools for crimping electrical connectors on conductors and more particularly to a hand tool of the type wherein connectors or terminals in strip form are successively and automatically fed to an properly positioned between crimping jaws for crimping.

The present invention is particularly concerned with magazine-type crimping tools that are manually operated without the use of any auxiliary source of power, and the construction of such a tool presents a number of special problems. Thus the amount of power available for operating the feeding and crimping mechanisms of the tool is quite limited, and it is essential that a considerable mechanical advantage be built into the tool to convert the relatively small manually applied force into the relatively high crimping pressures required for proper crimping. It is also desirable that the tool incorporate a means for positively ensuring complete crimping so that incomplete crimps will not be formed because of the failure of the operator to apply a sufficient manual force in operating the tool. The tool should desirably incorporate positive feeding and positioning mechanisms and these mechanisms as well as other parts of the tool must be sufficiently light in weight so that the resulting tool can be readily carried and handled by the operator.

It is accordingly an object of the present invention to provide an improved crimping tool capable of satisfying the various requirements outlined above. It is another object of the invention to provide a hand crimping tool wherein connectors or terminals are positively fed in succession to a crimping position for crimping, hereinafter referred to as "terminals in strip form," or "terminal strip." It is another object of the invention to provide a hand tool of this type incorporating relatively lightweight mechanisms for accurately locating a connector in crimping position and severing it from the feed strip. It is still another object of the invention to provide a hand tool having an improved structure for converting manually applied force into crimping pressure. It is a still further object of the invention to provide a hand tool structure wherein once a connector or terminal has been fed to crimping position it cannot be removed from the tool until it has been fully crimped.

Another object of this invention is to provide a hand tool of this type that provides a means for withdrawal of the terminal strip. It is also an object of this invention to provide a terminal crimping hand tool that prevents the inadvertent feeding of a terminal when the jaws are being opened.

An additional object of this invention is to provide a hand operated crimping tool that provides a positive means for retracting a lost motion linkage simultaneously with the operation of the handles. In substance this tool represents an improvement over a similar tool described in the co-pending patent application of George S. Reider, filed April 22, 1953, Serial Number 350,338, now Patent No. 2,777,345, issued January 15, 1957.

It is also an object of this invention to provide a handle tool for crimping electrical connectors that are light in weight, has a positive feed of the connectors, positive retraction of the feeding linkage, develops a high degree of power, prevents inadvertent feeding of the connectors and permits removal of the connectors.

In the drawings:

Figure 1 represents a side view of an improved crimping tool in the closed position;

Figure 2 represents a side view of the crimping tool shown in Figure 1, in an opened position;

Figure 3 shows a fragmentary perspective view of a part of the retracting device;

Figure 4 shows a view taken along plane 4—4 of Figure 1;

Figure 5 shows a top view of the ratchet control;

Figure 6 shows a view taken along line 6—6 of Figure 5 showing the ratchet in one position;

Figure 7 is a view similar to Figure 6 showing the ratchet in a different position;

Figure 8 represents a bottom view of the ratchet device;

Figure 9 shows a section taken through plane 9—9 of Figure 8;

Figure 10 shows a fragmentary view of the ratchet shown in Figures 5 to 9;

Figure 11 shows a section taken through 11—11 of Figure 2;

Figure 12 shows a section taken through 12—12 of Figure 9, including the relationship of the ratchet to the rest of the device;

Figures 13 and 14 show perspective exploded views of the terminal feeding means;

Figure 15 shows a terminal crimped to a conductor;

Figures 16 and 17 show the terminal in strip form in relationship to the holding and feeding means;

Figures 18 and 19 are exploded perspective views of the crimping die block;

Figure 20 shows the relationship of the strip terminals to the block in crimping position;

Figures 21 and 22 show the strip retracting means in two positions taken through section 21—21 of Figure 23;

Figure 23 is an end view of the strip retracting means; and

Figure 24 is a perspective view of the terminal release mechanism.

Referring to the drawings, and particularly to Figures 1 and 2, the tool there shown is seen to comprise generally a pair of handles 20, 22, pivotally connected at their left-hand ends by a pin 24. At the left-hand end of lower handle 22, and formed integrally therewith, is a crimping head 26 in which there is mounted a lower fixed crimping jaw assembly 28 and an upper vertically slidable crimping jaw assembly 30. Referring to Figure 2 as well as to Figure 1, the upper crimping jaw assembly 30 is provided with a horizontal slot 32 (more clearly shown in Figure 18) that is engaged by a pin 34 fixed to the upper handle 20. Thus as the handles 20 and 22 are opened and closed about pivot pin 24, the pin 34 cooperates with slot 32 of the upper crimping jaw assembly to give the upper assembly a straight line reciprocating movement with respect to the lower assembly 28.

As shown in Figures 4 and 13 of the drawings, the terminals to be crimped between the jaws 28—30 are fed thereto in the form of a strip 36. While the present hand tool is not limited in its use to the particular type of terminal shown in Figures 13 and 16, the illustrated terminals are typical of those that can be crimped with advantage in this tool. The terminals shown comprise a ring portion 38 formed integrally with a metal ferrule or barrel 40 over which there is an insulating sleeve 42.

The individual terminals are connected by connecting pieces 44 to form a strip.

In operating the tool, the handles are opened and the opening of the handles operates by mechanism described hereafter to advance the leading terminal of the strip 36 to a position between the crimping jaws 28 and 30. The stripped end of an insulated electrical conductor is then inserted in the ferrule 40 in such manner that a small amount of insulation of the conductor is positioned within the insulating sleeve 42. Thereafter the handles are brought together to crimp the terminal to the end of the conductor. As shown in Figure 15, the terminal is crimped at two points, 46 and 48. The crimp 46 serves to crimp the metal ferrule 40 of the terminal to the bare end of the conductor and the crimp 48 serves to crimp the sleeve 42 to the insulated portion of the conductor.

Reverting to Figure 1 and also referring to Figure 12 of the drawing, the lower handle 22 is shown of generally U-shaped cross-section and is provided with a longitudinal partition 50 which forms a track on which strip 36 of terminals is adapted to ride. As shown in Figure 12, the track 50 has an upper level 52 on which the ring portions 38 of the terminals ride and a lower level 54 on which the sleeve portions 42 of the terminals ride.

The crimping head

The construction of the crimping head is best shown in Figures 1, 2, 4, 11, 18 and 19 of the drawings. The crimping head (see Figures 4 and 11) comprises a housing generally designated 60 and made up of a base plate 62, side plates 64 and 66 and end plates 68 and 70. The side 66 of the crimping head is provided with a slot 72 which, as shown in Figure 11, exposes portions of the crimping assemblies and permits insertion of a conductor into a terminal that has been positioned between the crimping jaws.

As previously pointed out, the crimping head includes a lower crimping jaw assembly 28 and upper crimping jaw assembly 30, the parts of which are best shown in Figures 11, 18 and 19, respectively, of the drawings. Referring first to Figure 19, the lower assembly comprises a generally rectangular anvil 74 having a vertical, substantially triangular slot 76 formed therein. Also formed in anvil 74 at one side of slot 76 there is a small recess 78. As shown in Figure 20 when a terminal is in crimping position its ring portion 38 lies on the upper surface of anvil 74 and the adjacent portion of the insulating sleeve 42 rests in the recess 78. Also the connecting piece 44 that connects the first and second terminals of the strip 36 lies across the top of slot 76. As described more fully below, when the upper crimping jaw assembly is lowered the terminal to be crimped is held firmly in the proper position against the anvil 74 and the connecting piece 44 is cut to sever the leading terminal from the strip.

Again referring to Figure 19, positioned next to the anvil 74 is an inner lower crimping jaw 80 having a recessed die surface 82 formed in its upper surface. The ends 84 and 86 of crimping jaw 80 extend forwardly to provide a recess in which a second crimping jaw 88 (the insulation crimping jaw) is adapted to fit. The crimping jaw 88 is provided with a recessed die surface 90, and a series of three holes 94 corresponding with holes 97 of the jaw 80. The mating holes 94 and 97 are adapted to receive a pin 96 by means of which the jaws 80 and 88 are secured together. The holes 94 of crimping jaw 88 are in approximate registry with the series of holes 97 in crimping jaw 80 but are located on slightly different centers so that the jaws 80 and 88 can be relatively adjusted by inserting the pin 96 in different but corresponding holes of the two crimping jaws. This construction permits the clearance between the insulation crimping jaws to be adjusted for different thicknesses of insulation on the conductor to be crimped. The crimping jaws 80 and 88 and anvil 74 which comprise the lower crimping jaw assembly 28 are fastened in the crimping head housing 60 by means of pins 98 which, as indicated in Figure 19, extend through holes 99 in anvil 74 in holes 86 in crimping jaw 80 and also through the side plates 64 and 66 of the housing 60. Thus the lower crimping jaw assembly 28 is held in fixed position in housing 60. The arrangement of parts of the assembly 28 is also shown in Figure 11 of the drawings.

Referring now to Figure 18, the upper crimping assembly comprises a terminal-positioning and severing member 100 having a downwardly extending shearing element 102 provided with shearing edges 104 and 106 that cooperate, when the crimping assembly is lowered, with the upper edges of slot 76 of anvil 74 to cut one of the connecting pieces 44 and thereby sever from the terminal strip 36 the terminal that is to be crimped. Integral with the shearing element 102 there is a positioning finger 108 that has a bevelled lower end and is of approximately triangular cross-section. The positioning finger 108 is shaped to conform with the inner upper edge of slot 76 of anvil 74, and as the upper assembly is lowered passes into the approximately triangular space between the rings 38 of adjacent terminals, thereby insuring proper positioning of the terminal that is to be crimped.

Next to the positioning member 100 there is a plate 110 provided with a downwardly extending positioning finger 112. As the upper assembly 30 is lowered the fingers 108—112 straddle the connecting piece 44 and enter slot 76 to insure proper positioning of the terminal strip and particularly of the the leading terminal for crimping. The positions of the fingers 108 and 112 with respect to the terminal strip are particularly shown in Figure 17.

Next to the plate 110 there is an upper crimping jaw 114 which is provided with a recessed die surface 116 and a slot 32, previously described, which engages pin 34 of the upper handle and by means of which the upper assembly is actuated. The upper assembly 30 also includes an upper insulation crimping jaw 118 which is provided with a die surface 120 and a guide member 121.

The insulation crimping jaw 118 is secured to crimping jaw 114 by a pin in the same manner that the jaws 80 and 88 are secured together by pin 96. The positioning member 100, plate 110 and crimping jaw 114 are held together by the pins 124 and the relative positions of these parts when assembled is illustrated in Figure 11.

As previously pointed out and shown in Figure 2, the pin 34, which is fixed to the upper handle 30, engages slot 32 in upper crimping jaw 114 and thereby causes the upper crimping assembly to move in a straight line reciprocating motion as the handles are opened and closed. The side plates 64 and 66 of the crimping head housing 60 are provided with slots 126 (also see Figure 11) through which the pin 34 moves as the handles are operated. It is noted that placement of the guide member 121 on the upper assembly provides a passageway to permit the expulsion of subsequent terminals in the event that a crimped terminal becomes wedged in the crimping die nest. This is accomplished by terminal stripper 500 (Figure 24) which has a flat, horizontal plate 502 for stripping improperly crimped terminals. As shown in Figure 2, stripper 500 is secured to the tool head by pivot pin 24.

During the crimping operation, the crimped terminal may become wedged into the upper die 120. As shown in Figures 1 and 2, the stripper 500 is disposed between the closed position of die 120 (Figure 1) and the open position of this die (Figure 2). Thus as the die 120 starts its upward travel with the terminal wedged therein, when it passes the stripper 500, the stripper arm 502 engages the terminal tongue 38 and prohibits further travel of the terminal. Since the die 120 continues to move upwardly, the terminal is disengaged from the die.

Feed and detent mechanism

The feed and detent mechanism are particularly shown in Figures 2, 3, 5 to 10, 13 and 14 of the drawing.

Referring first to Figure 13, the feed mechanism includes a stepped lever 130 comprising a finger piece 132 and an elongated feed arm 134 terminating in a pair of fingers 136 and 138 that are adapted to straddle the connecting piece 44 between adjacent terminals of the strip 36. Figure 16 is a detailed view showing the location of the fingers 136 and 138 when they are positioned to engage the strip 36 preparatory to feeding a terminal into crimping position.

Referring to Figures 2 and 4, the lever 130 is pivotally mounted on the handle 22 in the following manner. The handle is provided with a pair of upstanding ears 140 and 142 containing horizontal slots 141. The lever 130 is mounted by means of a pin 144 in these slots so that it can pivot about pin 144 and also move longitudinally in the slots. Pivotally connected to the center of pin 144 is a feed-actuating lever 146 which (see Figure 14) is pivotally connected at its upper end to the handle 20 by means of a pin 149 (see Figure 2). As shown in Figure 3, the upper end of lever 146 is provided with a slot 148 that is formed in the end of lever 146 and is engaged by the pin 149. Thus the slotted end of lever 146 and pin 149 provide a lost motion linkage and the arrangement of the parts is such that the handles can be separated to the full line position of Figure 2, i. e., the half-open position, before movement of handle 20 causes lever 146 to advance the feed lever 130. With this construction relative movement of handles 20 and 22 between the full-line position of Figure 2 and the closed position of Figure 1 produces no movement of the feed mechanism.

As shown in Figure 3 the lost motion linkage between the slotted end of lever 146 and pin 149 also includes a guide pin 51 which is secured to pin 144 but passes through a hole in pin 149. A spring 153 surrounds the guide pin 151 and is so contained within the lever 146 that one end of the spring bears against pin 144 and the other end bears against the pin 149. This imparts a positive backward motion to the feed pawl immediately upon the upper handle being lowered, to prevent the upper crimper from bearing against the feed pawl by reason of the upper crimper being urged downwardly prior to the feed pawl being retracted.

Referring now to Figure 4, this figure shows three resilient strips which as indicated in Figure 14 are integral with a plate 147 that is secured to handle 22 by screws 158. The assembled position of the resilient strips 150, 152, and 154 is shown in Figure 4. As shown in Figure 4 and also in Figure 14, strip 154 is a hold-down spring for feed lever 130. Thus, spring 154 tends to urge lever 130 in a counter-clockwise direction thereby urging fingers 136 and 138 into engagement with terminal strip 36. The second resilient strip 150 is resiliently biased toward the terminal strip and bears against the terminal strip to hold the strip in place when the feed mechanism is retracted. The spring 170 has a tab 174 which projects beyond the casing, as shown in Figure 4. This permits the operator to remove a terminal by raising the tab 174 upwardly to release it from the die nest. The function of the third resilient strip 152 will be described later.

Ratchet mechanism

In a hand crimping tool of the general type here being described, it is undesirable, once the feeding of a terminal has started, to interrupt the operation of the tool until the crimping of the terminal on the conductor has been completed, since if the operation is interrupted an improperly crimped connection may be obtained. Accordingly, mechanism is provided in the present tool which prevents removal of a partially crimped terminal from the tool, and makes it necessary for the operator to close the handles completely before the crimped terminal can be removed.

Referring to Figure 2 of the drawings, interconnecting the handles 20 and 22 there is seen to be a ratchet mechanism generally designated 180 that is pivotally connected to handle 20 by a pin 182 and pivotally connected to handle 22 by a pin 184. This ratchet mechanism, as will now be described, so controls the operation of the handles 20 and 22 that once the feeding of a terminal to crimping position has started, the handles must be moved first to the fully open position and then to the fully closed position before a crimped terminal can be removed from the device. Thus the production of an incompletely crimped connection is positively prevented. Also the construction of the ratchet mechanism 180 is such that the handle can be moved to a half-open position and then closed again without going through the fully open position and crimping a terminal. This partial opening movement of the handle is necessary to permit disengagement of the crimped terminal from the crimping jaws.

The construction of ratchet mechanism 180 is best shown in Figures 5 through 10 of the drawings. Referring first to Figure 8, the ratchet mechanism there shown comprises a tubular housing 186 and a rack bar 188 constructed to telescope with the housing and provided, within the housing, with two spaced racks 190 and 192. Located between the racks 190 and 192 and mounted in the rack bar 188 for transverse sliding movement there is a rack member 194 having a relatively narrow rack 196 formed thereon. As shown in Figure 9, the rack member 194 comprises a rectangular block 197 transversely slidable in a slot 198 of rack bar 188 and having a depending rack support 200 of reduced diameter on the lower surface of which the rack 196 is formed. Reverting to Figure 8, transverse movement of the rack member 194 is effected by means of a pair of bosses 202 and 204 formed on the inner surface of housing 186. The boss 202 guides rack member 194 in a direction to move rack 196 out of alignment with racks 190 and 192 and the boss 204 guides rack member 194 in a direction to bring rack 196 into alignment with racks 190 and 192.

As shown in Figure 12, detents are provided for retaining the rack member 194 in the terminal positions of its travel. Formed in the rack member 194 there is a well 206 containing a coil spring 208 that bears against the under side of a sphere 210 located at the open end of the well. Formed on the under side of rack bar 188 there are a pair of spaced recesses 212 and 214 positioned to cooperate with the sphere 210 to retain rack member 194 in one of its two operative positions until it is forced into the other position by one of the bosses 202 and 204. More specifically, when the rack member 194 is in the position shown in Figure 5, 6 and 8, the sphere 210 is urged into recess 212 to hold the rack member in this position, whereas when the rack member 194 is in the position shown in Figure 7 the sphere 210 cooperates with recess 214 to hold the rack member 194 in the position of Figure 8.

Referring to Figure 9, mounted in the lower portion of housing 186 there is a pawl 226 secured to a shaft 228 that is pivotally mounted in the housing. The pawl 226 is urged toward a vertical neutral position by a spring 230 which is normally under tension and is secured to a pin 232 fixed to the housing.

The rack member 194 is moved into alignment with the racks of rack bar 188 by the boss 204 to provide a continuous rack on the rack bar after the handles have been separated past the half-open position. Also, the boss 202 is located to move the rack member 194 out of alignment with the racks of rack bar 188 after the rack member 194 has passed pawl 226 during movement of the handles toward each other to crimp the connectors between the jaws.

As shown in Figures 5–9 a latch pin designated 402 is provided to prevent inadvertent feed of a terminal caused by opening the handles too far. This is accomplished by the use of a spring urged latch pin 402. The upper plate 186 of the ratchet housing contains a slot 403 which accommodates the pin 402. The slot 403 has a reduced portion 406 which allows the handles to be opened to a point permitting removal of the crimped terminal but prevents the mechanism from being opened more than this distance until the pin 402 is depressed to allow a narrow portion 408 on the pin to enter a reduced slot 406 thus permitting the handles to be opened to their full extent. This permits feeder lever 130 which advances the next terminal of the strip to a crimping position between the dies, to begin the cycle over again. A spring 410 is affixed to the ratchet bar at one end and passes through a slot 412 in the pin thereby maintaining the pin in its upper position until such time as the pin is depressed by the operator to permit the feeding of an additional terminal. A flattened section 414 on the pin permits it to slide past the past the boss 204. Thus a means is provided which enables the operator to open the jaws halfway but prevents the inadvertant opening of the handles more than halfway to a point which would prematurely begin the feed of an additional terminal.

With the above relationships in mind, the effect of the rack member 194 is obvious. The handles can be operated from the closed position of the handles to the half-open position with the rack member 194 out of alignment with the two racks 190, 192 as shown in Figures 8 and 9. From this position the handles can be closed with no resulting harm because the feeder mechanism has not yet been actuated. However, by continuing the handle separation past the half open position, the feeder mechanism will be actuated, and no reverse movement of the handle will be permitted due to the engagement of the pawl 226 with rack 192. During the last half of the opening cycle the boss 204 will move rack member 194 into alignment with racks 190 and 192, thereby providing a continuous rack. After the opening cycle has been completed, the rack 192 will have passed pawl 226 thereby releasing the engagement therebetween, and the feeder mechanism will have moved a connector terminal into the die nest.

Now, by moving the handles toward each other the closing stroke will begin and pawl 226 will again engage rack 192 and will ratchet along the rack permitting continuous movement in one direction. By virtue of the racks 190, 196 and 194 forming a continuous rack no separating movement of the handles will be permitted by the pawl until the closing stroke has been completed. Thus, it is seen that rack member 194 prevents separating the handles once the closing cycle has begun.

Such separating movement could occur, but for the presence of the rack member, and would result in the undesirable actuation of the feeder mechanism. After the closing cycle is completed, the crimping action has taken place, and the terminal connector is ready for removal. To remove the work piece the handles must again be separated but not past the half-open position in order to prevent actuation of the feeder mechanism. However, since at this time the boss 202 has moved rack member 194 out of alignment with racks 190 and 192, a separate stop means must be utilized. The stop means, limiting movement to the half-open position, is represented by the pin 402 and the walls between slot 403 and its reduced portion 406.

Terminal release

In order to release the strip of terminals from the magazine, mechanism is provided as shown in Figures 21-23 wherein a releasable finger grasps the terminals and holds them in a position adjacent to the magazine as the magazine is retracted. Specifically this mechanism is comprised of a latch member 302 made of spring steel, which member is riveted or otherwise secured to the bottom of the magazine. As shown in Figure 21 the member is so formed as to be substantially V shaped intermediate of its extremities as at 304. The latch member 302 is so deformed as to provide a hook-shaped finger 306 at its free end. When the spring member is cammed toward a straight line position (as will be subsequently explained) the finger 306 is urged toward the terminals and engages the innermost terminal (see Figure 22). Thus when the magazine is retracted the finger 306 causes the terminal strip to be withdrawn along with it. Preparatory to removing the magazine, it is necessary to depress finger piece 132 (Figure 13) to raise the feed arm 134 thus releasing the fingers 136, 138 from the connecting piece 44 secured to the lead terminal.

The means for actuating finger 306 includes a strip of spring steel 308 which extends the length of the magazine. A shoulder 310 projecting therefrom is positioned so as to lie between the V-shaped portion 304 and the hook 306. It is apparent from Figures 21 and 22 that when strip 308 is retracted, the shoulder 310 is also retracted and bears against V-shaped portion 304 to cam it upwardly. Urging the strip 308 upwardly also causes the hook 306 to rise and in its upward position it engages the inner terminal so that the terminal strip will be retracted with the magazine. The outer edge of the spring steel strip is curled into a U-shape so as to form a tab 311 for actuating the release. A rolled edge 312 of the tab engages a struck-out portion 314 in the magazine to prevent disengagement of the magazine and the release rod. The spring steel rod 308 is flexed so that the shoulder 310 is urged in a direction toward the bottom of the chamber away from the hook 306 so as to keep the hook from prematurely engaging the terminal strip.

Operation

The operation of the mechanism should be largely apparent from the foregoing description. As the handles 20 and 22 are separated from the closed position of Figure 1, the pivot 149 of handle 20 moves in slot 148 and no feeding movement of the feed mechanism occurs until the half-open position of the handles is reached, as evidenced by the failure of the handles to open further. The pin 402 is then depressed which permits further opening of the handle, thus causing the feed-actuating lever 146 to advance the feed lever 130 along slots 141 and fingers 136 and 138 move the leading terminal of terminal strip 36 into crimping position. During this advancing movement of the feed mechanism the strip 152 rides up over the second terminal of the strip 36. The spring 320 is depressed as the terminal rides over it on the feed stroke and then snaps back to its upward position to hold the terminal strip against movement. As shown in Figure 22 each terminal is positively held in crimping position. As the handles 20 and 22 are brought together pivot 144 rides along slot 141 during the first part of the closing movement and retracts the feed lever 130 while fingers 136 and 138 ride over the next terminal of the strip.

After the terminal is properly fed into the jaws, the handles 20, 22 are brought together causing die assembly 28 to mate with die assembly 30. A conductor is inserted in the terminal and continued motion of handles 28, 30 toward each other causes the die assemblies to effect a crimp and simultaneously shear the terminal from the strip. The ratchet assembly prohibits opening the handles until a complete crimp is made.

Thus a tool is provided that will prevent the inadvertent feeding of a terminal prematurely and will insure a proper crimp before the tool is released.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:
1. A hand operated crimping tool having a pair of dies movable toward each other into crimping position, a pair of handles for urging said dies toward or away from each other, a pair of relatively slidable members constituting a linkage between the handles, a slot in one of the slidable members, said slot having a narrowed portion, a pin movable in the slot and secured to the second member, said pin including a body with a reduced portion, whereby the handles may be moved away from each other until the pin body engages the narrow portion of the slot, at which time the movement of the handles may be continued by adjusting the pin to permit the reduced portion to engage the narrow portion of the slot.

2. The device as set forth in claim 1 wherein the pin is adjustable and a spring means urges the pin into a position which permits the body of the pin to engage the narrow slot, whereby the pin must be urged against the action of the spring to permit the reduced portion of the pin to move into the narrow slot.

3. In a hand operated crimping tool for crimping terminals to a conductor, of the type wherein the terminals are contained in the tool in strip form and are fed singly into a pair of crimping dies, said crimping dies being actuated by a pair of handles the improvement comprising means for retracting the terminal strip including a hook-shaped member for grasping one of the terminals of the strip, said hook-shaped member being secured to one of the handles in one position by a resilient means and a cam member slidably mounted in the handle with the cam engaging the resilient means, whereby sliding the cam member relative to the resilient means urges the hook-shaped portion from one position of engagement with one of the terminals on the strip to a second position of non-engagement.

4. In a crimping tool having a pair of dies adapted to be urged toward each other by handle means to crimp a terminal therebetween, the terminal being fed into the dies from a terminal strip positioned on the tool, the improvement comprising: a magazine slidable in the tool for retaining the terminal strip, an opening in the magazine, a hook-shaped member resiliently secured to one side of the magazine by means of a V-shaped rod, whereby the hook shaped member may be urged to a holding position wherein it extends through the opening in the magazine or retracted to an inoperative position, a cam member bearing against one side of the V-shaped rod and slidably mounted in the tool, whereby the cam member may be urged against the V-shaped rod to force the hook-shaped member into the holding position, or retracted to permit the hook-shaped member to return to the inoperative position, and a rod secured to the cam member extending to the outside of the magazine for operating the cam member.

5. In a cirmping tool having a pair of dies adapted to be urged toward each other by handle means to crimp a terminal therebetween, the terminal being fed into the dies from a terminal strip positioned on the tool, the improvement comprising: a means for feeding the terminals of the terminal strip into the dies when the handles are moved from a partially open position to a full open position and releasable stop means for preventing the handles from opening beyond a partially open position until released by the operator, whereby the inadvertant feeding of a terminal is prevented.

6. In a crimping tool having a pair of dies adapted to be urged toward each other by handle means to crimp a terminal therebetween, the terminal being fed into the dies from a terminal strip positioned on the tool, the improvement comprising: a releasable stop means between the handles of the tool permitting limited separation of the handles but preventing separation of the handles to full open position until the means is released, a magazine comprising a flat plate slidable in one of the handles and removable therefrom for supporting the terminal strip, a hook-shaped member secured to the magazine, and means for operating the hook-shaped member causing it to engage the terminal strip, whereby the terminal strip may be withdrawn from the tool when the magazine is removed.

References Cited in the file of this patent
UNITED STATES PATENTS

| | | |
|---|---|---|
| 2,396,913 | Carlson | Mar. 19, 1946 |
| 2,549,838 | Miller | Apr. 24, 1951 |
| 2,612,932 | Vinson | Oct. 7, 1952 |
| 2,692,384 | Pollock | Oct. 26, 1954 |
| 2,722,146 | Byrem | Nov. 1, 1955 |